July 23, 1968 F. WEHMER 3,393,937
SUPPORTS FOR THE HUMAN BODY
Filed Dec. 27, 1966 4 Sheets-Sheet 2

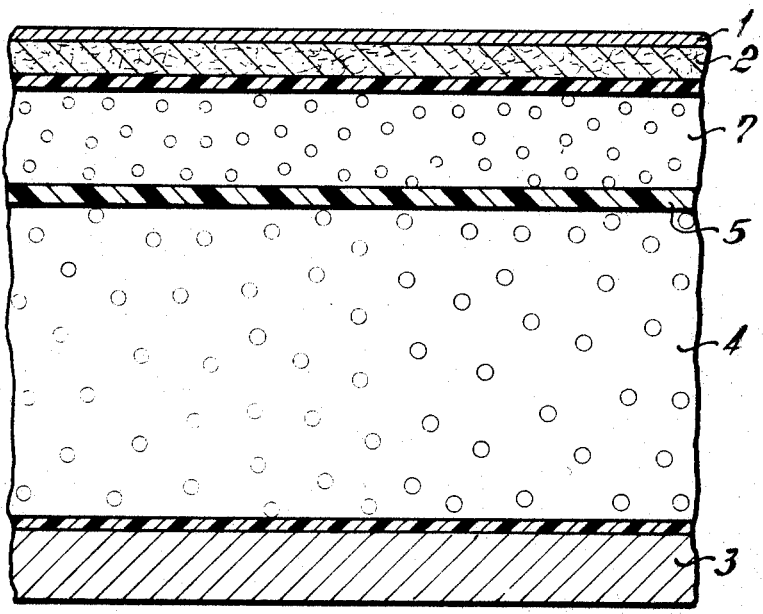
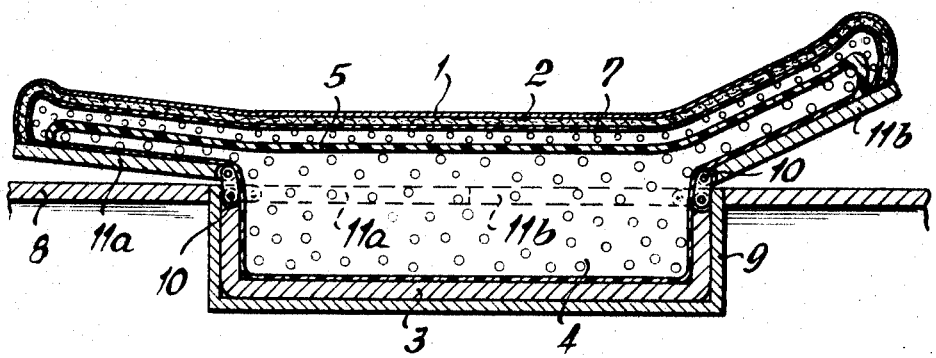

INVENTOR
Felix Wehmer
by Fraser, Wilson & Fraser
attorneys

July 23, 1968   F. WEHMER   3,393,937
SUPPORTS FOR THE HUMAN BODY
Filed Dec. 27, 1966   4 Sheets-Sheet 3
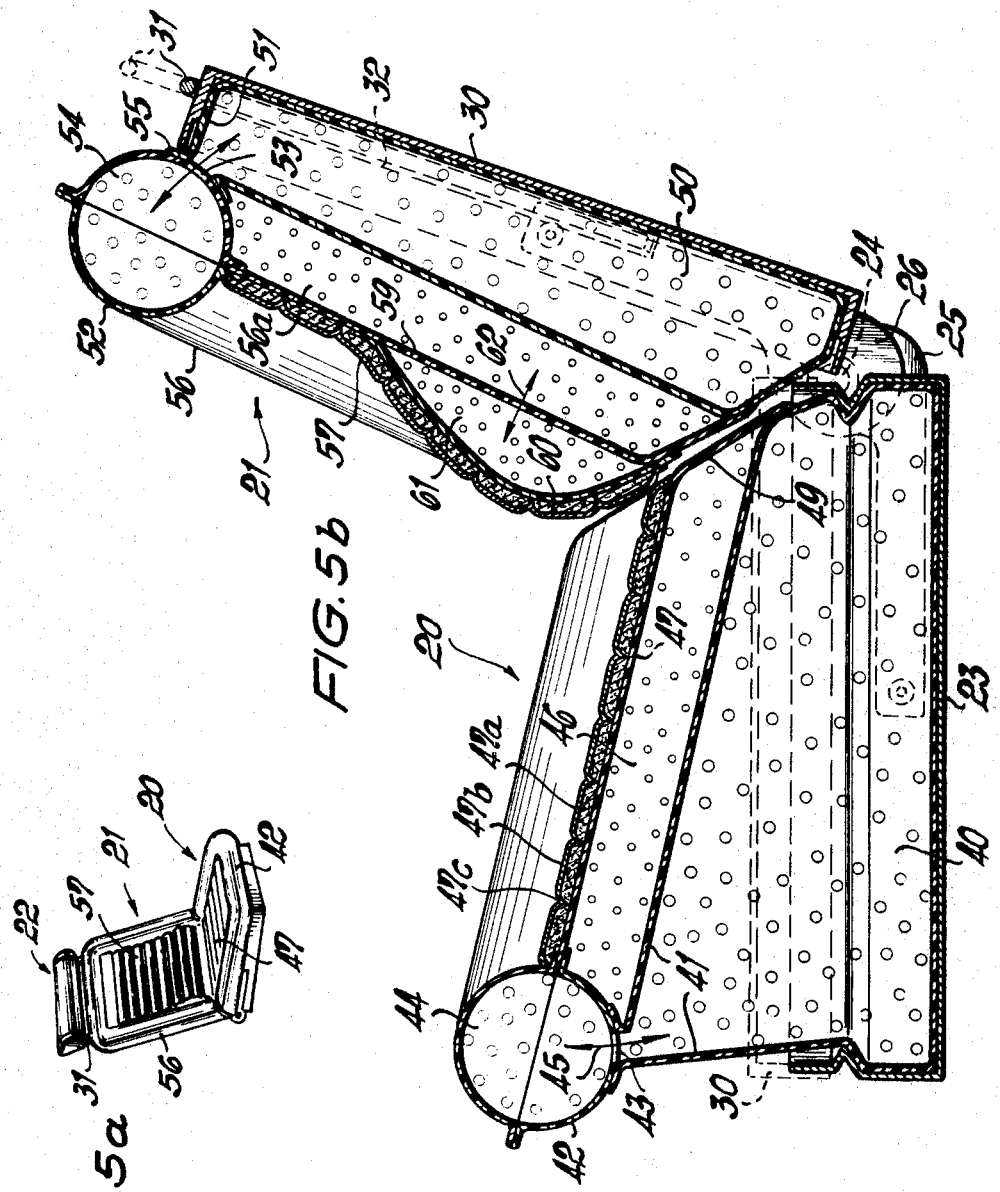
INVENTOR
Felix Wehmer
by Fraser, Wilson & Fraser
attorneys July 23, 1968   F. WEHMER   3,393,937
SUPPORTS FOR THE HUMAN BODY
Filed Dec. 27, 1966   4 Sheets-Sheet 4

INVENTOR
Felix Wehmer
by Fraser, Wilson & Fraser
attorneys 3,393,937
SUPPORTS FOR THE HUMAN BODY
Felix Wehmer, Kurfurstenstrasse 61, Essen, Germany
Filed Dec. 27, 1966, Ser. No. 605,043
Claims priority, application Germany, Dec. 30, 1965,
W 40,619
7 Claims. (Cl. 297—378)

The present invention relates to seats, couches, and bends and other upholstered means for supporting the human body in a resting or working position.

The invention is more particularly concerned with folding seats and couches for vehicles.

One particular object of the invention is to provide a folding seat which is more compact when folded than known vehicle seats.

A further object of the invention is to provide a vehicle seat whose back will fold down so as to be flush with the floor of a vehicle so as to make possible a simple and rapid changeover from passenger carrying to freight transport.

A still further object of the invention is to provide a vehicle seat which in the unfolded or erected condition is highly resilient, while in the folded condition is extremely compact and light in weight.

A further object of the invention is to provide a seat whose upholstery is light in weight and yet has a high degree of resilience and is shaped for maximum comfort of the occupant.

In accordance with these and further objects to be described below, the present invention consists in a support for the human body comprising a substantially horizontal base, a frame set at an angle to the base of at least substantially 90°, hinge means connecting the base and the frame, the hinge means defining a hinge axis extending along adjacent sides of the frame and of the base, the frame being capable of being folded towards the base from an extended position to a folded position about the hinge axis, pressurized cushion means covering the base, at least part of the upper surface of the cushion means being substantially horizontal, upright wall means extending upward from sides of the base so as to enclose part of the cushion means, the cushion means adjacent to the hinge axis extending substantially along the whole of an arc running, concentrically to the hinge axis, from the base to the frame, the frame being at an angle to the base, and over-cushion means covering the cushion means and the frame, the over-cushion means being pressurized separately from the cushion means and forming a support area for the human body to rest on.

In accordance with a preferred feature of the invention, the cushion means covers not only the base but also the frame, and lies between the frame and the over-cushion means on the frame. The frame can be plate-like so that when the frame and base are folded together, the frame forms a lid cooperating with the wall means in forming a structure closed to the top and to the side.

In one preferred embodiment of the invention, the base is plate-like and is adapted to cooperate with the wall means and the frame in forming a closed box-like structure which can be easily carried.

In an embodiment of the invention in the form of a couch, two such frames are used, hinge means being provided on opposite sides of the base for the attachment of the frames.

In the erected or unfolded condition of the frame the design can be such that the combined thickness of the cushion means and the over-cushion means on the base is at least one third greater in height than the height of the wall means.

In a particular embodiment of the invention to be described below, a pressurized cushion-like bead runs around the edges of the support area formed by the over-cushion means.

In order that my invention may be readily understood to those in the art, some embodiments of it are now described with reference to the attached drawings.

FIG. 1 is a diagrammatic section showing the construction of cushions used in embodiments of the invention.

FIG. 4 shows a reclining couch embodying the invention.

FIG. 5a shows a general perspective view of a vehicle seat embodying the invention.

FIG. 5b is a front to back section of the vehicle seat shown in FIG. 5a.

FIG. 6 is a side to side section through the back rest portion of the seat shown in FIG. 5a.

FIG. 7 is a vertical side to side section of the horizontal portion of the seat shown in FIG. 5a.

In the diagrammatic section of a seat shown in FIG. 1, it can be seen that the uppermost layer 1 is the covering material or fabric which lies directly on top of a layer 2 of porous of other material (well known to those in the art) capable of allowing the skin of a person occupying the seat to "breath." Underneath the layer 2, there is provided a resilient upholstery structure forming an important part of my invention and to be described as follows.

Figure 3:
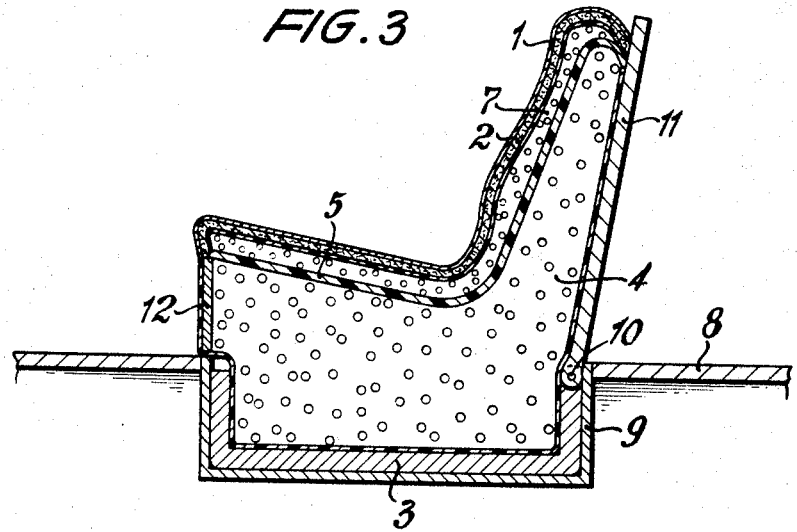
FIG. 3 shows the seat of FIG. 2 in the extended or erected condition.
Figure 6:
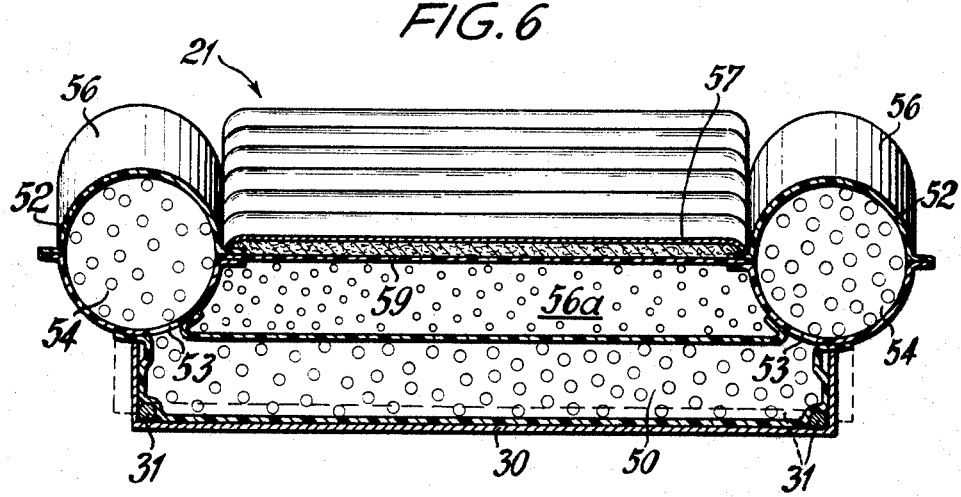
Figure 7:
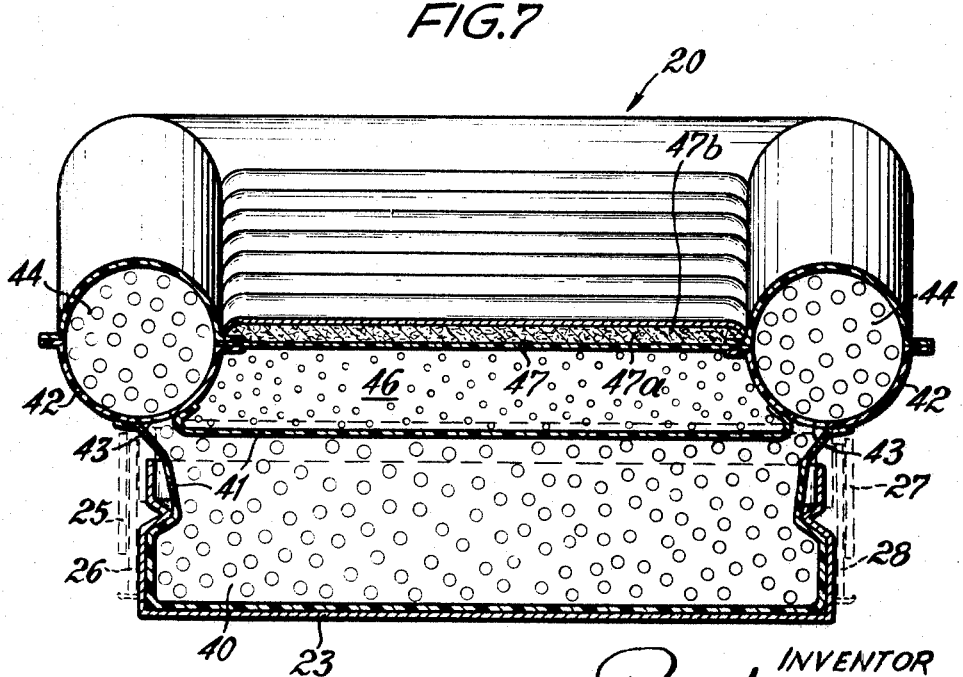

As can be seen from FIG. 1 and FIG. 3, the seat comprises an air-tight base which in turn supports an overlying pressurized cushion 4. The air pressure in the cushion can be comparatively high since, as will be explained below, it serves to hold the back frame of the seat in the erected condition and generally ensures the correct degree of rigidity of the seat. The cushion 4 can be pressurized from various sources of air or other gases. For instance it can be inflated from tyre inflating devices as used in garages. Alternatively, an individual cylinder of pressurized air can be provided as is customary practise with inflatable life-jackets and rafts. The cushion 4 is separated by a partition layer 5 from an over-cushion 7 which can also be filled with air using similar sources. The press in cushion 7 can be regulated by means of a valve (not especially shown) at the side of the seat so as to suit the weight of the person wishing to use the seat. Generally, the pressure in the over-cushion 7 is lower than in cushion 4.

Figure 2:
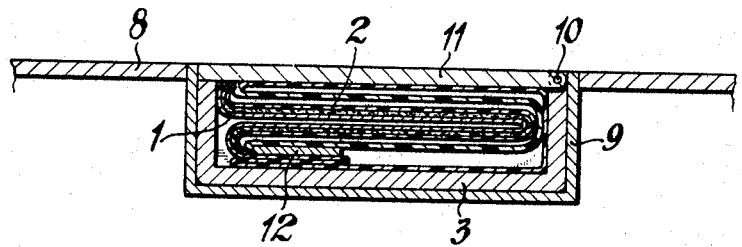
FIG. 2 shows a first seat embodying the invention, in the folded condition.

The practical application of the principle of seat or couch construction just explained is shown in FIGS. 2 and 3 (in the case of a seat) and in FIG. 4 (in the case of a couch). The seat shown in FIGS. 2 and 3 is mounted, for example, in an aircraft with a deck 8. A shallow recess defined by parts such as 9 let into the deck receives the base 3 of the seat. The base of the seat is connected by a pair of hinges 10 with a back frame 11, the hinge axis running along adjacent sides of the base and of the frame. Owing to the provision of the hinges 10, the frame 11 can be moved between the erected position shown in FIG. 3 and a folded-down position as shown in FIG. 2. In the latter position, the frame 11 is flush with the deck surface, thus making the deck area of the aircraft immediately suitable for freight as opposed to passengers.

As can be seen from FIG. 3, the lower pressurized cushion 4 is considerably thicker than the over-cushion 7, though it is not so large as to prevent folding of the seat as shown in FIG. 2. As can be seen, the cushion 4 covers not only the base 3 but also the frame 11 and extends along the whole of an imaginary arc extending concentrically about the hinge axis from the frame to the base 3. As a result of this latter feature, the material of the cushion 4 adjacent to the hinge axis tends to hold the back frame 11 in the erected position shown in FIG. 4.

To the front, the cushion 4 is delimited by an air-tight layer 12. The base 3 has upright side wall portions extending upwards towards the level of the deck inside the recess so as to enclose part of the cushion 4 to the side.

The embodiment of the invention shown in FIG. 4 is in the form of a reclining couch with two frames 11a and 11b pivoted to opposite sides of the base and acting as a two-part lid when the couch is folded. The use of two frames provides for a long body-supporting surface of the couch.

The seat shown in FIGS. 2 and 3 and the couch shown in FIG. 4 can be constructed so that they can be removed from the recess in the deck and, when in the folded condition, resemble boxes which can be easily carried about in the manner of a suit-case. The sides of such boxes are formed by the frame 11 (or 11a and 11b) made in the form of a plate, the bottom of the base 3 (also made plate-like), and four side walls between the frame (or frames) and the base. The possibility of removal in this manner is especially advantageous in the case of automobiles since the seats can then be used for camping or other outdoor activities.

The embodiment of the invention shown in FIGS. 5a to 7 is a folding seat which can be used, for example, as a driver's seat in a motor vehicle. As shown in the general perspective view of FIG. 5a, the seat has an approximately horizontal portion 20, a back portion 21, and a support 22 (of conventional construction, and hence not further described) for the nape of the neck. The horizontal portion and the back portion are shaped so as to conform with the human body in the sitting position.

The horizontal portion 20 comprises a frame or base 23 (see FIG. 5b) made, for instance, of light alloy, and having a general shape similar to the bottom part of a suit-case. It is provided with lateral hinges 24 each having two anchoring arms 25, 26, and 27, 28 (see FIG. 7) which are fixed to the base 23 and to a back frame 30. In the particular embodiment shown, the back frame 30 resembles the lid of a suit-case and consequently is considerably shallower than the base 23. When the frame 30 is folded down on to the base 23 and locked in position (by means not specially shown), the structure resembles a suit-case in size and weight and consequently can easily be carried around as hand baggage. The position of the top of the frame 30 in the folded down position is indicated by a broken line in FIG. 5b.

For carrying the seat when folded, I provide a U-shaped handle 31 whose limbs extend downwards into vertical tubes 32 running down the back frame 30. The handle 31 can be pulled out somewhat for gripping it with the hand or can be pushed back into the frame when not required. In accordance with another feature of the invention, the handle can be constructed so as to carry the support 22 for the back of the neck and provide for its adjustment.

Both the base 23 and the frame 30 of the seat have pressurized cushions which are indicated by reference numerals 40 and 50 respectively. These cushions are delimited by casings 41 and 51.

The casing 41 is made of air-impermeable flexible material and is attached to part of the periphery of the base 23. The upper rim portion of the casing 41 is connected with a bead 44 having a casing 42 made in two parts. The bead 44 surrounds three sides of the bottom part of the seat as is shown in FIG. 5a. At 43 there is a connection allowing air to flow between the interior of the bead 44 and that of the cushion 40 as indicated by the double arrow 45.

Resting on the upper, approximately horizontal surface of the cushion 40 there is an over-cushion 46a whose top surface 47 is in turn overlain by upholstery fabric 47b with transverse ribs 47c indicated in broken lines. Between the fabric 47b and the surface 47 there is a porous material or padding adapted to enable the adjacent parts of the occupant of the seat to "breath."

The construction of the cushioning on the back frame 30 of the seat is generally similar to that on the base. There is a casing 51 defining a cushion 50 which is connected pneumatically at 53 with the interior of a bead 54 with a casing 52. Air can thus flow between the bead and the cushion 50 at 53 as indicated by the double arrow 55. An over-cushion 65a on the cushion 50 is enclosed by a casing 59 covered in part by upholstery fabric with transverse ribs 57 similar to the ribs 47c.

There is also a further casing 60 enclosing an overcushion 61 which is pneumatically connected with the over-cushion 56a so that air can flow between them as indicated by the double arrow 62. The over-cushion 61 serves to adapt the back part of the seat to provide maximum comfort for the occupant of the seat.

The cushions 40, 50, 46a and 56a are provided with valve connection for inflating and pressurizing them, the cushions 40 and 50 being given a comparatively high pressure, while the pressure in the cushions 46a and 56a is somewhat lower. The valves can be of entirely conventional construction and are therefore not illustrated. They can be made to allow for rapid deflation by simple pressure of a finger on a button or the like.

It will be noted that the cushion means, that is to say the main cushions 40 and 50 extend around most of an imaginary arc from the frame 30 to the base 23 concentrically with and adjacent to the hinge axis. Owing to this feature, the cushions 40 and 50 hold the frame 30 in the erected or unfolded position.

A notable advantage of the seat just described is that in the folded condition it only takes up between about 20 and 30% of the space it occupies when erected. The use of such seats in land or other vehicles (and also in buildings) provides for a particularly simple and rapid changeover from seating purposes to freight carrying or storage.

A further advantage of seats in accordance with the invention is the high degree of comfort which can be obtained owing to the ease with which the air pressure in the over-cushions (7 in the first and second embodiments of the invention, and 46a, 56a in the third) can be adjusted.

Another advantage which is particularly significant for aircraft and other rapidly travelling vehicles is that, owing to the use of air as a medium for ensuring the resilience of the seats (as opposed to fibrous stuffing such a kapok or horse-hair), a comparatively large degree of shock force can be absorbed in the case of a collision or crash.

While I have described several forms of my invention in order that those skilled in the art may take full advantage of the invention, it is to be understood that the invention is not to be limited in scope to these merely illustrative forms, but includes all variations coming within the spirit and gist of the following claims.

I claim:

1. An upholstered support for the human body, comprising:

a substantially horizontal base;

a frame set at an angle to the base of at least 90°;

hinge means connecting the base and the frame, the hinge means defining a hinge axis extending along adjacent sides of the frame and of the base, the frame being able to fold towards the base from an extended position to a closed position, the folding taking place about the hinge axis;

pressurized cushion means covering the base, at least part of the upper surface of the cushion means being approximately horizontal;

upright wall means extending upwards from the sides of the base so as to enclose part of the cushion means, the cushion means adjacent to the hinge axis extending along substantially the whole of an arc which is concentric with the hinge axis and runs from the frame to the base;

and over-cushion means covering the cushion means and the frame, the over-cushion means being pressurized separately from the cushion means and providing a support area for the human body.

2. The structure as set forth in claim 1 in which the cushion means covers the frame and lies between the frame and the over-cushion means on the frame.

3. The structure as set forth in claim 1 in which the frame is plate-like and, when the frame and the base are folded together, forms a lid cooperating with the wall means in forming a structure closed at the top and at the side.

4. The structure as set forth in claim 3 in which the base is plate-like and is adapted to cooperate with the wall means and the frame in forming a closed box-like structure.

5. The structure as set forth in claim 1 comprising two such frames, and two such hinge means arranged on opposite sides of the base.

6. The structure as set forth in claim 1 in which in the extended position of the frame, the combined vertical thickness of the cushion means and the over-cushion means over the base is at least substantially one-third greater than the height of the wall means.

7. The structure as set forth in claim 1 further comprising a pressurized cushion-like bead running round the edge of the support area.

References Cited

UNITED STATES PATENTS

| | | | |
|---|---|---|---|
| 2,869,597 | 1/1959 | Mark | 312—298 |
| 3,017,642 | 1/1962 | Rosenberg et al. | 5—349 |
| 3,029,109 | 4/1962 | Nail | 297—461 |
| 3,093,407 | 6/1963 | Wilson | 297—4 |
| 3,112,956 | 12/1963 | Schick et al. | 297—219 |
| 3,267,882 | 8/1966 | Rapson et al. | 108—51 |

BOBBY R. GAY, *Primary Examiner.*

GLENN O. FINCH, *Assistant Examiner.*